United States Patent [19]

Oare et al.

[11] Patent Number: 5,368,082

[45] Date of Patent: * Nov. 29, 1994

[54] RADIAL PLY PNEUMATIC TIRE

[75] Inventors: Thomas R. Oare, Suffield; Randall R. Brayer, North Canton; Jeffrey W. Kahrs, Hartville; Beale A. Robinson, North Canton; Keith C. Trares, Akron; Raymond D. McQuate, Wadsworth, all of Ohio

[73] Assignee: The Goodyear Tire & Rubber Company, Akron, Ohio

[ * ] Notice: The portion of the term of this patent subsequent to Nov. 23, 2010 has been disclaimed.

[21] Appl. No.: 954,209

[22] Filed: Sep. 30, 1992

[51] Int. Cl.5 .................. B60C 15/024; B60C 15/04; B60C 17/00

[52] U.S. Cl. .................................. 152/517; 152/540; 152/544; 152/549; 152/555; 245/1.5

[58] Field of Search ............... 152/152, 516, 517, 520, 152/539, 540, 544, 549, 555, DIG. 9; 245/1.5

[56] References Cited

U.S. PATENT DOCUMENTS

| 1,294,161 | 2/1919 | Pratt | 245/1.5 |
|---|---|---|---|
| 1,437,013 | 11/1922 | Pratt | 245/1.5 |
| 3,542,108 | 11/1970 | Rye et al. . | |
| 3,682,223 | 8/1972 | Simpson . | |
| 3,707,177 | 12/1972 | Boileau . | |
| 3,861,442 | 1/1975 | Bertrand | 152/540 |
| 3,911,987 | 10/1975 | Takusagawa et al. . | |

(List continued on next page.)

FOREIGN PATENT DOCUMENTS

| 486907 | 10/1976 | Australia . | |
|---|---|---|---|
| 495698 | 3/1977 | Australia . | |
| 518813 | 11/1981 | Australia . | |
| 530898 | 4/1983 | Australia . | |
| 1164324 | 3/1984 | Canada . | |
| 0005399 | 11/1979 | European Pat. Off. . | |
| 0371755 | 6/1990 | European Pat. Off. . | |
| 0475258 | 3/1992 | European Pat. Off. . | |
| 2374173 | 7/1978 | France . | |
| 2389504 | 12/1978 | France . | |
| 3924619 | 7/1989 | Germany . | |
| 4-221209 | 8/1992 | Japan | 245/1.5 |
| 1056771 | 1/1967 | United Kingdom . | |
| 1423401 | 2/1976 | United Kingdom . | |
| 1522843 | 8/1978 | United Kingdom . | |
| 2033316 | 5/1980 | United Kingdom . | |
| 2138367 | 10/1984 | United Kingdom | 152/517 |

OTHER PUBLICATIONS

*The Plain Dealer*, Aug. 6, 1992, "Tire Makers Unveil New 'Run-flat' Models," p. G-1.

Primary Examiner—Geoffrey L. Knable
Assistant Examiner—Adrienne C. Johnstone
Attorney, Agent, or Firm—David L. King

[57] ABSTRACT

A radial ply pneumatic tire is described. The tire has a carcass with a bead portion, a carcass reinforcing structure, and a bead filler. The carcass reinforcing structure has two plies with turnup ends wrapped about each bead. The turnup end of the first ply terminates in radial proximity of the maximum section width of the tire. In a preferred embodiment of the invention, the tire carcass includes elastomeric first and second fillers the first filler being located between the first ply and the innerliner of the tire, and the second filler being located between the first and second ply. The fillers stiffen the sidewalls to permit the tire to be driven while uninflated. The bead core of the preferred embodiment has a flat base and a first and second surface extending from the base and inclined relative to the base thereby forming acute included angles of $\alpha$ and $\beta$ whereby $\alpha$ is greater than or equal to $\beta$. The tire may further include an aramid overlay radially outwardly of the reinforcing belt.

32 Claims, 4 Drawing Sheets

U.S. PATENT DOCUMENTS

| | | |
|---|---|---|
| 3,935,892 | 2/1976 | Arimura et al. . |
| 3,954,131 | 5/1976 | Hoshino et al. . |
| 3,964,532 | 6/1976 | Harrington . |
| 3,983,919 | 10/1976 | Messerly . |
| 4,067,374 | 1/1978 | Alden et al. . |
| 4,142,567 | 3/1979 | Johannsen et al. . |
| 4,162,698 | 7/1979 | Merli et al. . |
| 4,193,437 | 3/1980 | Powell . |
| 4,202,393 | 5/1980 | Ikeda et al. . |
| 4,235,273 | 11/1980 | Edwards et al. . |
| 4,261,405 | 4/1981 | Yamauchi et al. . |
| 4,265,288 | 5/1981 | Kaneko et al. . |
| 4,287,924 | 9/1981 | Deck et al. . |
| 4,365,659 | 12/1982 | Yoshida et al. . |
| 4,405,007 | 9/1983 | Welter . |
| 4,917,164 | 4/1990 | Ushikubo et al. . |
| 4,998,575 | 3/1991 | Kanamaru ............................ 152/540 |
| 5,131,445 | 7/1992 | Tokieda et al. ...................... 152/539 |
| 5,145,536 | 9/1992 | Noma et al. . |
| 5,205,883 | 4/1993 | Kanamaru . |
| 5,263,526 | 11/1993 | Oare et al. ........................... 152/540 |

RADIAL PLY PNEUMATIC TIRE

BACKGROUND OF THE INVENTION

This invention relates to a tire; more particularly to a pneumatic tire capable of being used in the uninflated condition.

Various tire constructions have been suggested for pneumatic run-flat tires, that is, tires capable of being used in the uninflated condition. One approach taken has been to simply strengthen the sidewalls by increasing the cross-sectional thickness thereof. Due to the large amounts of rubber required to stiffen the sidewall members, heat build-up is a major factor in tire failure. This is especially true when the tire is operated for prolonged periods at high speeds in the uninflated condition.

An equally important design consideration in the development of a run-flat tire is insuring that the uninflated tire remains seated on the rim. Solutions have been developed employing bead restraining devices as well as special rims to accomplish this requirement.

Applicants have discovered a new invention which permits a tire construction to be built which can be operated in the uninflated condition for extended distances at relatively high speeds after which the tire can be repaired and returned to normal use, while at the same time maintaining the desired performance of the tire in the inflated state.

SUMMARY OF THE INVENTION

A radial ply pneumatic tire is described. The tire has an axis of rotation, a tread having a pair of lateral edges, a pair of reinforcing belts located radially inward of the tread, a pair of sidewalls extending radially inwardly from each lateral edge, a maximum section width defined as the maximum axial distance as measured from the outer surfaces of the sidewalls, and a tire carcass structure.

The tire carcass structure comprises a pair of bead portions, a carcass reinforcing structure and two bead fillers. The bead portion extends radially inwardly from each sidewall. Each bead portion includes a substantially inextensible bead core having a coil of annularly wound round metal wire filaments, which in the toroidially-shaped tire prior to its vulcanization, has a polygonal cross-sectional area defined by imaginary line segments contacting the outer surfaces of the filaments of the coil, the polygonal cross-sectional area having a flat base surface. The flat base surface has a pair of edges and a width "W" between the edges. The bead core further has an axially inner first surface, an axially outer second surface and a radially outward point or surface, each first surface and each second surface extending radially outwardly from an opposite edge of the flat base surface. Each first and second surface toward the radially outward point or side is tangent to the bead core. The first surface and the flat base surface form an acute included angle $\alpha$. The second surface and the flat base surface form an acute included angle $\beta$. The angle $\alpha$ is greater than or equal to the angle $\beta$.

The carcass reinforcing structure is radially inward of the reinforcing belts and extends circumferentially about the tire from one bead portion to the other bead portion, the carcass reinforcing structure has a first ply and a second ply. Each ply has a pair of turnup ends, one turnup end of each ply is wrapped about each bead core and extends axially and radially outwardly. The turnup end of the first ply terminates in proximity to the radial location of the maximum section width of the tire.

Each bead filler is adjacent to and extends radially outward from a bead core.

One embodiment of the invention includes an aramid overlay disposed radially outward of the belt reinforcing structure.

Another embodiment of the invention includes a pair of first fillers located between an innerliner and the first ply. One first filler extends from each bead portion radially to beneath the reinforcing belt.

Another embodiment includes, in addition to the first filler described above, a second filler. The second filler is disposed between the first and the second ply. The second filler extends from each bead portion radially outward to beneath the reinforcing belt.

Another embodiment includes a cord reinforcement member located between the bead filler and the second ply turnup. The cord reinforcement member has a first and second end. The first end is axially and radially inward of the second end. The cord reinforcing member increases in radial distance from the axis of rotation of the tire as a function of distance from its first end.

Another embodiment includes a pair of fabric reinforcing members, one member integral of each of the bead portions. The fabric reinforcing member has a first and second end, the reinforcing member is wrapped about the first end second plies and the bead core. Both the first and second ends extend radially above the bead core.

DEFINITIONS

Figure 1:
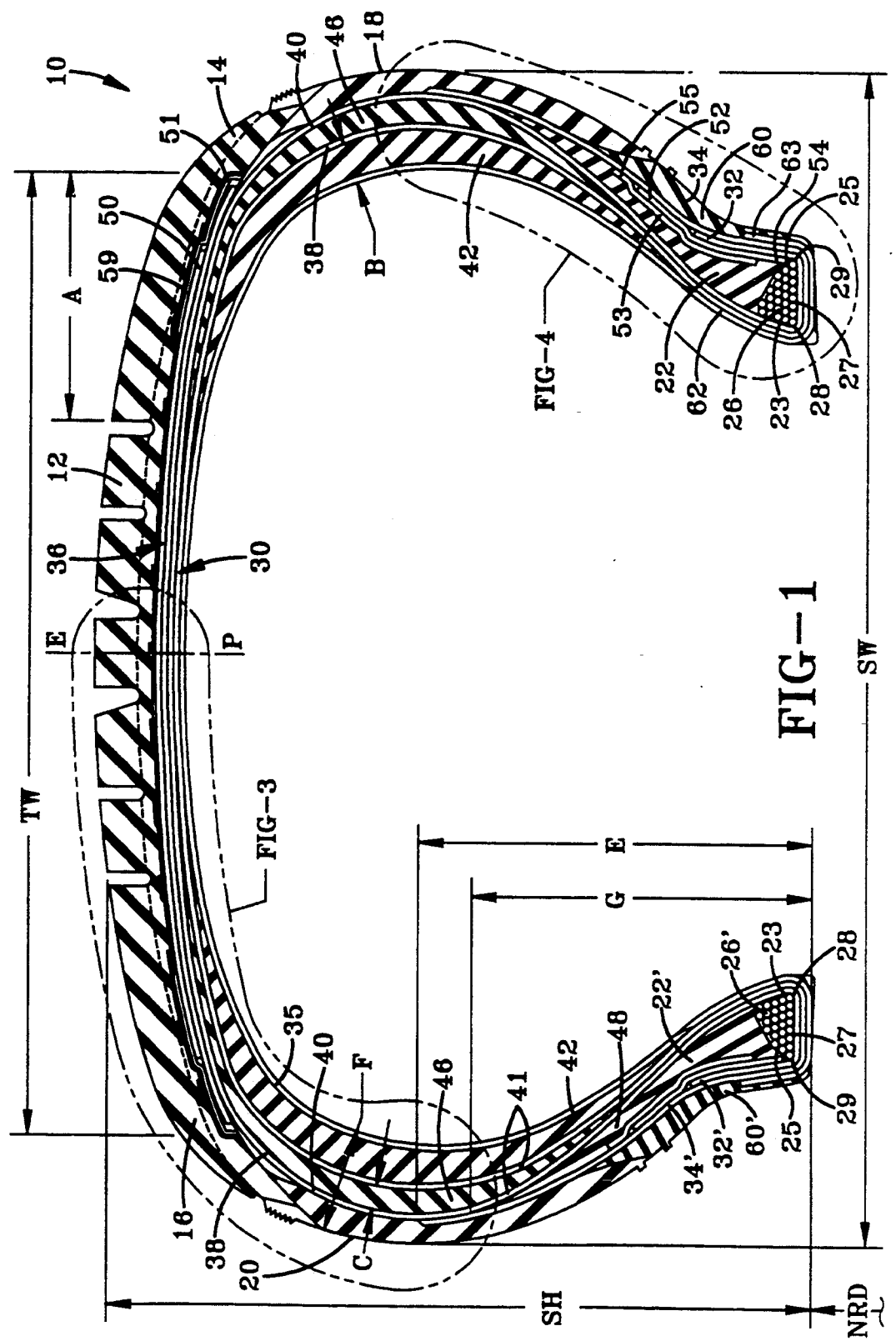
FIG. 1 is a cross-sectional view of a tire made in accordance with the present invention.

"Aspect Ratio" means the ratio of a tire's section height to its section width.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, and sidewall rubber over the plies, but including the beads.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific load assigned by the appropriate standards organization for the service condition for the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE PREFERRED EMBODIMENT

Figure 2:
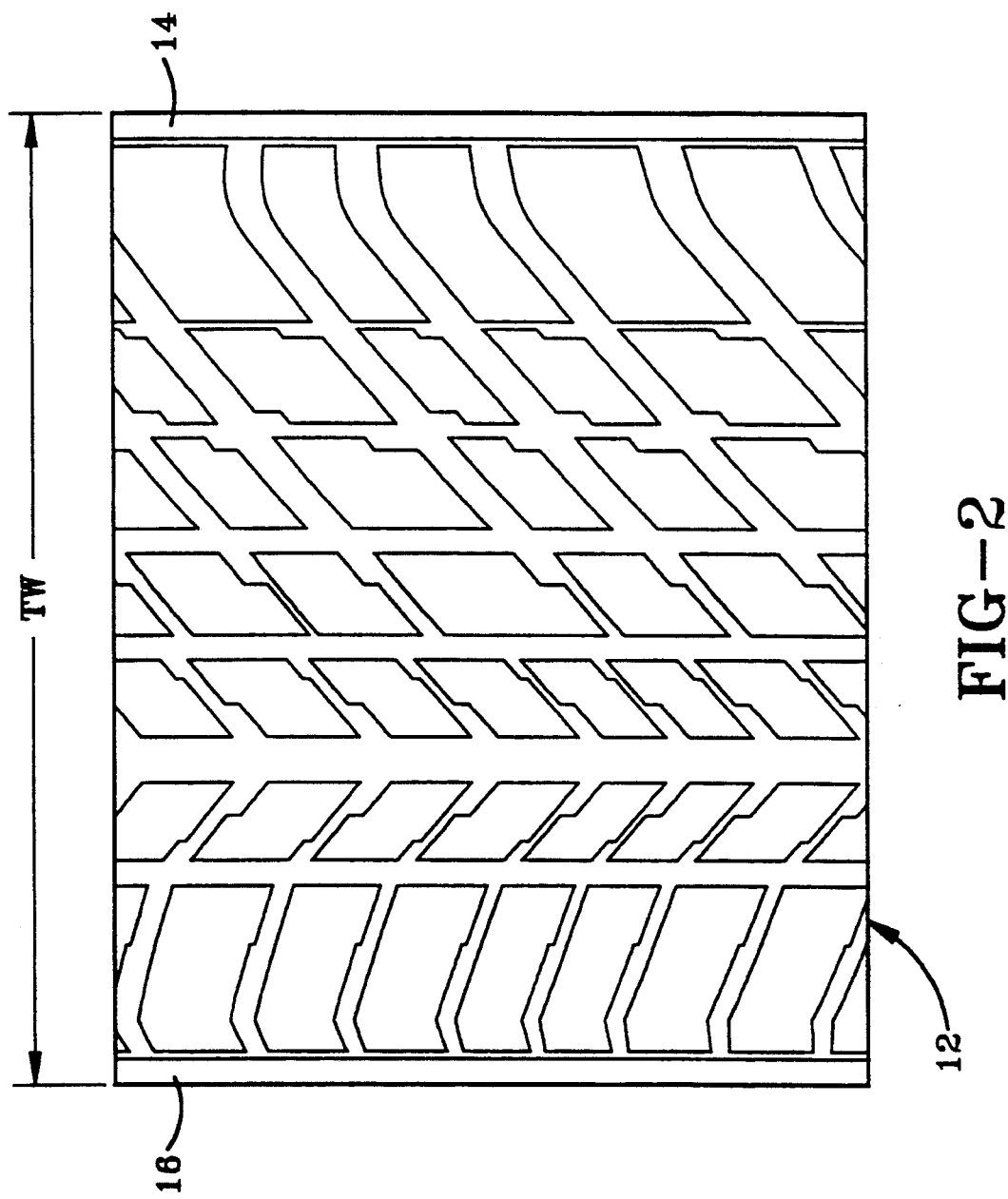
FIG. 2 is a plan view of a footprint of the tread portion of the tire of FIG. 1.

Referring to FIGS. 1 and 2, there is illustrated a tire 10 made in accordance with the present invention. In the particular embodiment illustrated, the tire 10 is a passenger tire; the tire 10 is provided with a ground-engaging tread portion 12 which terminates in the shoulder portions 14,16 at the lateral edges of the tread respectively. Sidewall portion 18,20 extends from shoulder portion 14,16 respectively and terminates in a pair of bead portions 22,22' each having an annular inextensible bead core 26,26' respectively. The tire 10 is further provided with a carcass reinforcing structure 30 which extends from bead portion 22 through sidewall portion 18, tread portion 12, sidewall portion 20 to bead portion 22'. The turnup ends 32,34,32',34' of carcass reinforcing structure 30 are wrapped about bead cores 26,26' respectively. The tire 10 may include a conventional inner liner 35 forming the inner peripheral surface of the tire 10 if the tire is to be of the tubeless type. Placed circumferentially about the radially outer surface of carcass reinforcing structure 30 beneath tread portion 12 is a tread reinforcing belt structure 36. In the particular embodiment illustrated, belt structure 36 comprises two cut belt plies 50,51 and the cords of belt plies 50,51 are oriented at an angle of about 23 degrees with respect to the mid-circumferential centerplane of the tire. The cords of belt ply 50 are disposed in an opposite direction to the mid-circumferential centerplane and from that of the cords of belt ply 51. However, the belt structure 36 may comprise any number of belt plies of any desired configuration and the cords may be disposed at any desired angle. Belt structure 36 has a lateral stiffness across the belt width so as to minimize lifting of the tread from the road surface during operation of the tire in the uninflated state. In the embodiment illustrated, this is accomplished by making the cords of belt plies 51,52 of steel and preferably of a steel cable construction.

The carcass reinforcing structure comprises at least two reinforcing ply structures. In the particular embodiment illustrated, there is provided a radially inner first reinforcing ply structure 38 and a radially outer second reinforcing ply structure 40, each ply structure 38,40 comprising one layer of parallel cords. The cords 41 of reinforcing ply structure 38,40 are oriented at an angle of at least 75 degrees with respect to the mid-circumferential centerplane CP of the tire 10. In the particular embodiment illustrated, the cords 41 are oriented at an angle of about 90 degrees with respect to the mid-circumferential centerplane CP. The cords 41 may be made of any material normally used for cord reinforcement of rubber articles, for example, and not by way of limitation, rayon, nylon and polyester. Preferably, the cords are made of material having a high adhesion property with rubber and high heat resistance. In the particular embodiment illustrated, the cords 41 are made from rayon. The first and second reinforcing ply structure 38,40 each preferably comprise a single ply layer, however, any number of carcass plies may be used.

As further illustrated in FIG. 1, the first and second reinforcing ply structure 38,40 have turnup ends 32,34 and 32',34' respectively which wrap about the bead core 26 and 26' respectively. The turnup ends 34,34' of the second ply 40 are adjacent to the bead core 26,26' and terminates radially above the bead core 26,26'. The turnup ends 32,32' of the first ply 38 wrap about the second ply turnup ends 34,34' and the bead core 26,26'. The turnup ends 34,34' of the first ply terminates radially a distance E above the nominal rim diameter of the tire in proximity to the radial location of the maximum section width of the tire. In the preferred embodiment, the turnup ends 34,34' are located within 20% of the section height of the tire from the radial location of the maximum section width, most preferably terminating at the radial location of the maximum section width. Alternatively, turnup ends 32,32' can terminate as described above in proximity of the radial location of the maximum section width. In such a case the turnup end 34,34' of the first ply 38 can be radially above or below the second ply turnup end 32,32'.

Figure 4:
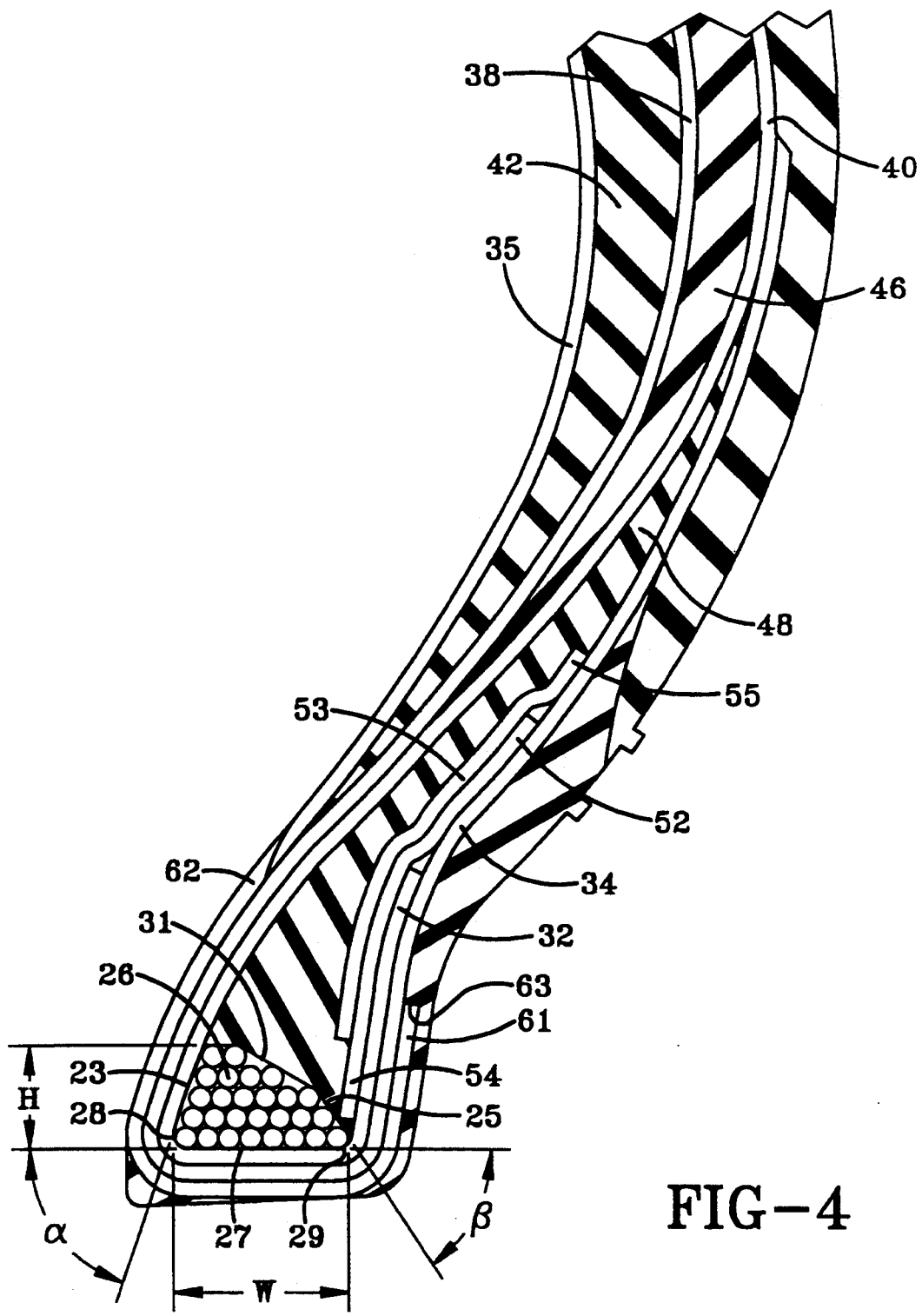
FIG. 4 is an enlarged fragmentary view of the bead portion of the tire of FIG. 1.

As further illustrated in FIG. 4, the bead portions 22,22' of the tire 10 each have an annular substantially inextensible bead core 26,26' respectively. The bead core 26,26' has a flat base surface 27,27' defined by an imaginary surface tangent to the radially innermost surfaces of the bead wires. The flat base surface 27,27' has a pair of edges 28,29 and a width "W" between the edges. The bead core has an axially inner first surface 23 extending radially from edge 28 and an axially outer second surface 25 extending radially from edge 29. The first surface 23 and the flat base surface 27,27' form an acute included angle α. The second surface 25 and the flat base surface 27,27′ form an acute included angle β. The angle α is greater than or equal to the angle β. In the preferred embodiment, α approximately equals β.

The bead core 26,26′ may further include a radially outer surface 31 extending between the first and second surfaces 23,25 respectively. The radial outer surface 31 has a maximum height H. The height H is less than the width of the base "W." The cross-section defined by surfaces 23,25,27, and 31 preferably are in the form of the base portion of an isosceles triangle. The upper portion of the triangular shape cross-section is generally not required because the strength of the core 26,26′ as illustrated is sufficient to restrain the beads of an uninflated tire on the rim.

The bead core is preferably constructed of a single or monofilament steel wire continuously wrapped. The bead construction is as described in co-pending patent application Ser. No. 07/954,770, now U.S. Pat. No. 5,263,526 (attorney's docket number 92291A) incorporated herein by reference.

The flat base surfaces of the bead cores 26,26′ are preferably about parallel relative to the axis of rotation, while the bottom of the molded portion of the bead is inclined, the preferred inclination being approximately 5° to 10.5° relative to the axis of rotation. The inclination of the bead portion assists sealing the tire and is complimentary to the inclination of the bead seat flange of a conventional rim and is believed to assist retaining the beads seated to the rim.

Located within the bead portions 22,22′ and the radially inner portions of the sidewall portions 16,18 are high modulus elastomeric fillers 48 disposed between carcass reinforcing structure 30 and the turnup ends 32,34 and 32′,34′ respectively. The elastomeric fillers 48 extend from the radially outer portion of bead cores 26,26′ respectively, up into the sidewall portion gradually decreasing in cross-sectional width. The elastomeric inserts 48 terminate a distance G from the nominal rim diameter NRD of at least 25 percent (25%) of the section height SH of the tire. In the particular embodiment illustrated, the elastomeric fillers 48 each extend radially outward from the nominal rim diameter NRD a distance of approximately forty percent (40%) of the maximum section height SH. For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead portions 22,22′ further includes at least one cord reinforced member 52,53 located between the bead filler 48 and the second ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIG. 4, the cord reinforced member comprises two components 52,53 having a width of about 4 cm. The axially outer component 52 has a radially inner end 54 that is radially above with the outer edge 29 of the bead core 26,26′. The axially inner component 53 has a radially inner end that is radially outward of the outer edge 29 of the bead core 26,26′ by about 1 cm. The axially inner and axially outer components 52,53, preferably have steel cord reinforcement. The second end 55 of the cord reinforced member is located radially outward of the second ply turnup end 32 and radially inward of the termination of the turnup end 34 of the first ply 38.

The cords of members 52,53 are preferably inclined forming an included angle relative to the radial direction in a range from 25° to 75°, preferably 30°. If two members are employed, the cord angles are preferably equal but oppositely disposed. The cord reinforcement member 52,53 dramatically improves the handling characteristics of a car having an uninflated tire of the present invention. The members 52,53 greatly reduce the tendency for the car to oversteer, a significant problem encountered in conventional tires that are driven while uninflated or underinflated.

A fabric reinforced member 61 may be added to the bead portion of the tire 10. The fabric reinforced member has first and second ends 62,63. The member is wrapped about the first and the second plies 38,40 and the bead core 26,26′. Both the first and the second ends 62,63 extend radially above and outward of the bead core 26,26′.

Figure 3:
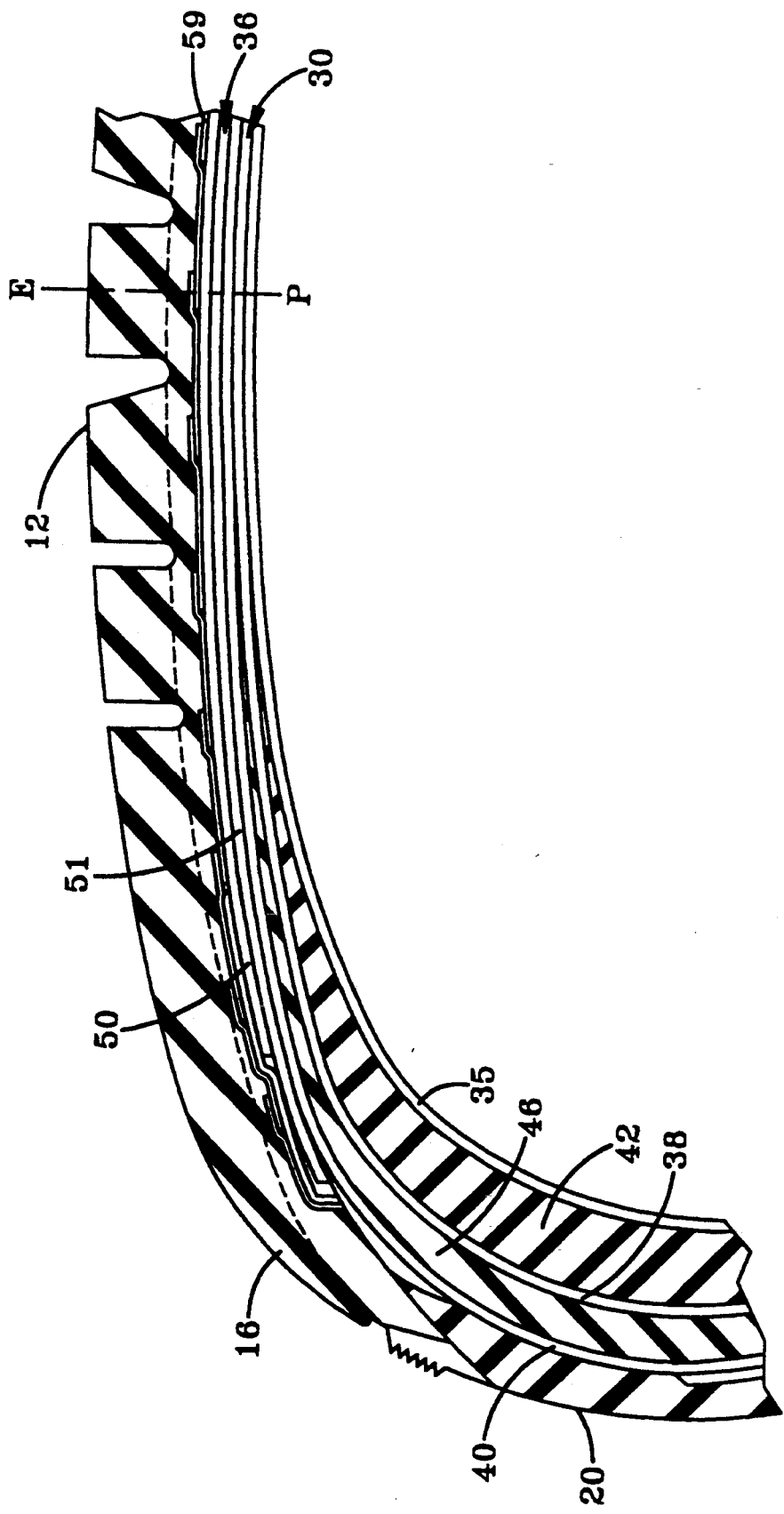
FIG. 3 is an enlarged fragmentary view of the shoulder portion of the tire of FIG. 1.

The sidewall portions 18,20 may be provided with elastomeric fillers 42. The first fillers 42 may be employed between the innerliner and the first reinforcement ply 38. The first fillers 42 extend from each bead portion 22,22′ radially to beneath the reinforcing belt structure 36. Alternatively, as illustrated in the preferred embodiment of the invention as shown in FIGS. 1,3, and 4, the sidewall portions 18,20 may each include a first filler 42 and a second filler 46. The first fillers 42 are positioned as described above. The second fillers 46 are located between the first and the second plies 38,40 respectively. The second filler 46 extends from each bead portion 22,22′ radially outward to beneath the reinforcing belt structure 36.

The elastomeric first fillers 42 have a thickness B at the location of the maximum section width of the tire 10 of at least three percent (3%) of the maximum section height (SH), preferably of at least six percent (6%) and not greater than twelve percent (12%) of the maximum section height of the tire.

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane(EP) of the tire as measured from the footprint of the tire inflated to design inflation pressure, at rated load and mounted on a wheel for which it was designed. In the particular embodiment illustrated, the elastomeric first fillers 42 each have a thickness B of approximately seven percent (7%) of the maximum section height (SH) at the maximum section width of the tire.

The elastomeric second fillers 46 have a thickness C of at least one and one-half percent (1.5%) of the maximum section height of the tire 10 at the location of the maximum section width of the tire. In the preferred embodiment the elastomeric second fillers 46 each have a thickness C of approximately three and one-half percent (3.5%) of the maximum section height (SH) of the tire.

The overall cross-sectional thickness of the elastomeric fillers 42,46, and 48 preceding from the bead portion 22,22' to the shoulder portion 14,16 is preferably of constant thickness.

The overall sidewall thickness F in the region where it merges into the shoulder portions 14,16 is at least one hundred percent (100%) of the overall sidewall thickness as measured at the maximum section width SW of the tire. Preferably, the overall thickness F of the sidewall in the shoulder region of the tire is approximately one hundred twenty five percent (125%) of the overall sidewall thickness at the maximum section width SW.

Applicants have found that by placing a reinforcing elastomeric filler between adjacent reinforcing ply structures in the manner previously described, high levels of run flat performance can be obtained. During normal operation of the tire, the inflated medium provides the necessary support to carry the load. However, when the tire is operated in the uninflated state the sidewall portions must support the entire load. The tire construction of the present invention permits efficient use of the carcass structure in the uninflated condition while also providing the desired operating performance characteristics of the tire when operated in the inflated state. When the tire is operated in the uninflated state deflection of the tire is only slightly greater than when operated in the inflated state. The internal surfaces of the tire do not come into contact with each other during operation in the uninflated state. Pneumatic passenger tires made in accordance with the present invention have been found to be capable of operation in the uninflated state for distances of about 100 miles (160 km) at speeds of up to 55 miles per hour (88 km/h) at 80% of the 26 psi normal rated load per Tire and Rim Association and then be returned to normal operation in the inflated state. The drivable range in the uninflated condition can be in excess of 1000 miles (1600 km).

Performance of the tire when operated in the underinflated or uninflated condition may be enhanced by selecting a tread design which provides high lateral stability at the lateral end portions of the tread. Preferably, the tread design is as taught in co-pending patent application Ser. No. 07/736,182 incorporated herein by reference.

Run flat performance of the tire may be further enhanced by providing the ply coat of each layer of the reinforcing ply structures 38,40 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. Preferably, the elastomeric material used as a ply coat for the ply layers is similar to the elastomeric material used in the reinforcing fillers 42,46.

In practice, the rubber compositions for the first fillers 42, second fillers 46 and the plycoats for one or more ply structures 38 and 40 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with plies 38 and/or 40 having similar high stiffness/low hysteresis properties as hereinafter described.

Preferably, while the discussion herein refers to the plycoat(s) being for one or more of ply structures 38 and 40, in the practice of this invention, the plycoats referenced herein refers to plycoats for both plies 38 and 40 unless only one of such plies is used.

In particular, for the purposes of this invention, both of the aforesaid fillers 42 and 46 are characterized by having a high degree of stiffness yet by also having a relatively low hysteresis for such a degree of stiffness.

The stiffness of the rubber composition for fillers 42 and 46 is desirable for stiffness and dimensional stability of the tire sidewall.

The stiffness of the rubber composition for the ply coat for one or more of plies 38 and 40 is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers 42 and 46 and of the ply structures 38 and/or 40 cooperate with the plies 38 and/or 40 to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for one or more of the plies 38 and 40.

Hysteresis is a term for heat energy expended in a material (e.g.: cured rubber composition) by applied work and low hysteresis of a rubber composition is indicated by a relatively high rebound, a relatively low internal friction and relatively low loss modulus property values.

Accordingly, it is important that the rubber compositions for the fillers 42 and 46 and plycoats for one or more of plies 38 and 40 have the properties of both relatively high stiffness and low hysteresis.

The following selected desirable properties of the rubber compositions for the fillers 42 and 46 as well as for the plycoats for one or more of the plies 38 and 40 are summarized in the following Table 1.

TABLE 1

| Properties | Filler | Ply Coat |
| --- | --- | --- |
| Hardness (Shore A)[2] | 60–70 | 60–70 |
| Modulus (100%) MPa[3] | 5–7 | 4–6 |
| Static Compression[1] | 0.1–0.15 | 0.15–0.10 |
| Heat Buildup (°C.)[1] | <30 | <30 |
| Cold Rebound (about 23° C.)[4] | 55–70 | 55–70 |
| E' at 100° C. (MPa) | 10–15 | 10–15 |

TABLE 1-continued

| Properties | Filler | Ply Coat |
| --- | --- | --- |
| E″ at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be a moderate rubber hardness.

The indicated modulus property at 100% modulus is utilized instead of a 300% modulus because the cured rubber has a relatively low ultimate elongation at its breaking point. Such a cured rubber is considered very stiff.

The indicated static compression property, measured on a flexometer, is another indication of the relatively high stiffness of the cured rubber.

The indicated E′ property is a coefficient of the storage or elastic moduli component of the viscoelastic property which is an indication of the material (e.g.: cured rubber composition) stiffness.

The indicated E″ property is a coefficient of the loss or viscous moduli component of the viscoelastic property which is an indication of the hysteretic nature of the material (e.g.: cured rubber composition).

The utilization of both the E′ and E″ properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (e.g.: cured rubber composition).

The indicated cold rebound test property at about 23° C. (room temperature) is measured by Zwick Rebound Test (DIN 53512) test and is indicative of the material's (e.g.: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E″ and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for one or more of the plies 38 and 40 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/-butadiene, and polymers of oneor more of isoprene and butadiene such as 3,4-polyisoprene, styrene/isoprene/-butadiene terpolymers and medium vinyl polybutadiene.

It should readily be understood by one having skill in the art that rubber compositions for components of the pneumatic tire, including the first and second fillers 42 and 46 as well as ply coat(s) for one or more or plies 38 and 40, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 100 phr. Typical amounts of silica, if used, comprise about 5 to about 10 or 15 phr and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxysilylpropyl) tetrasulfide, bis-(3-trimethoxysilylpropyl) tetrasulfide and bis-(3-trimethoxysilylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344–346. Suitable antiozonant(s) and waxes, particularly microcrystalline waxes, may be of the type shown in the *Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators my be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for one or more of plies 38 and 40. The indicated amounts of materials have been rounded for the illustration of this Example.

TABLE 2

| Material | (Parts by Weight) | |
|---|---|---|
| | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Zinc Oxide | 5 | 8 |
| Accelerators (Sulfenamide type) | 4 | 2 |
| Sulfur (insol w/2% oil) | 2 | 4 |

Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent therefor; are used with two accelerators for the plycoat sample and one accelerator for the filler rubber composition sample.

1. Cis 1,4-polyisoprene type
2. Copolymer with ratio of isoprene to butadiene of about 1:1
3. A high cis 1,4 polybutadiene rubber The rubber compositions are molded and cured at about 150° C. for about 20 minutes.

In the practice of this invention, it is considered important that the rubber compositions for both the fillers 42 and 46 and the ply coat(s) for one or more of plies 38 and 40 are relatively very stiff, moderately hard, and have a low hysteresis.

Further, it is normally desired that the rubber composition for fillers 42 and 46, relative to the rubber composition for plycoats for plies 38 and/or 40 is slightly stiffer, slightly harder and that both of the rubber compositions have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property.

The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chaffing of the tire in the lower bead region radially outward of the carcass structure 30 adjacent the rim flange may be minimized, especially during use of the tire in the uninflated condition, by providing hard rubber chaffer portion 60,60'.

High speed performance of the tire may be enhanced by the application of a fabric overlay layer 59 disposed about the tread reinforcing belt structure 36. For example, two ply layers having nylon or aramid cords may be disposed about reinforcing belt structure 36, the lateral ends of extending past the lateral ends of the belt structure 36. Alternatively, a single layer of spirally wound aramid reinforced fabric can be employed as an overlay. The aramid material has a substantially higher modulus of elasticity than nylon and accordingly results in a stronger tire reinforcement than two layers of nylon. Applicants have found that a greater than 10% increase in high speed capability can be achieved in a tire with the single layer of spirally wound aramid overlay. Generally the use of aramid material in passenger tire applications is avoided due in part to the fact that the material exhibits poor noise properties that resonate sounds through the relatively thin sidewalls of the passenger tire. Applicants' tire of the present invention employs thick sidewalls which noticeably dampen tire generated noises. The noise dampening sidewalls permit the use of an aramid overlay without experiencing unacceptable noise levels.

In the illustrated preferred embodiment, the aramid reinforced fabric is wound circumferentially about the reinforcing belt layers overlapping the belt edges. The overlay fabric 59 is wrapped in approximately 2.5 cm (1.0 inch) wide strips which are abutted. Alternatively, each strip may overlap the adjacent wound strips. Preferably the strips overlap in the range of 25% to 100% of the strip width. At the axial extremes of the overlay, the strips may include multiple winding for added strength at these highly stressed areas.

While certain representative embodiments and details have been shown for the purpose of illustrating the invention, it will be apparent to those skilled in this art that various changes and modifications may be made therein without departing from the spirit or scope of the invention.

We claim:

1. A radial ply pneumatic tire having an axis of rotation, a tread having a pair of lateral edges, a pair of reinforcing belts located radially inward of the tread, a pair of sidewalls, one sidewall extending radially inwardly from each lateral edge, a maximum section width, and a tire carcass structure, the tire carcass structure comprising:

a) a pair of bead portions, one bead portion extending radially inwardly from each sidewall, each portion including a substantially inextensible core, the bead core having a coil of annularly wound round metal wire filaments, which in the toroidially-shaped tire prior to its vulcanization, has a polygonal cross-sectional area defined by imaginary line segments contacting the outer surfaces of the filaments of the coil, the polygonal cross-sectional area having a flat base surface having a pair of edges and a width "W" between the edges and an axially inner first surface, an axially outer second surface and a radially outward point or surface, each first and second surface extending radially outwardly from an opposite edge of the flat base surface toward the radially outward point or side and each first and second surface being tangent to the bead core, the first surface and the flat base surface forming an acute included angle $\alpha$ and the second surface and the flat base surface forming an acute included angle $\beta$, where $\alpha$ is greater than or equal to $\beta$;

b) a carcass reinforcing structure radially inward of the reinforcing belts extending circumferentially about the tire from one bead portion to the other bead portion, the carcass reinforcing structure having a first ply and a second ply, each ply having a pair of turnup ends, one turnup end of each ply being wrapped about each bead core and extending axially and radially outwardly, the turnup end of at least one ply terminating radially in proximity to the radial location of the maximum section width of the tire; and c) a bead filler adjacent each bead core and extending radially outward from the bead core.

2. The pneumatic tire of claim 1, further comprises:
an inner liner radially inward of the first ply;
a pair of first, and a pair of second fillers, the first fillers each being between the first ply and the innerliner, one first filler extending from each bead portion radially outward to beneath the reinforcing belt, the second fillers being between the first and second ply, one second filler extending from each bead portion radially outward to beneath the reinforcing belt; and
wherein one of the bead fillers is located above each bead core and between the second ply and the turnup ends of the first and second plies.

3. The pneumatic tire of claim 2 further comprises:
an overlay being radially outward of the reinforcing belts.

4. The pneumatic tire of claim 1 further comprises:
at least one cord reinforced member located between each bead filler and the second ply turnup, the cord reinforced men,her or members having a first end and a second end, the first end being axially and radially inward of the second end and each cord reinforced member or members increasing in radial distance from the axis of rotation of the tire as a function of distance from its first end.

5. The radial ply pneumatic tire of claim 1, wherein each bead core has a radially outer surface extending between the first and second surfaces, the radially outer surface having a maximum height of H, H being less than the width of the base W.

6. The radial ply pneumatic tire of claim 1, wherein the first and second plies have cords of rayon.

7. The radial ply pneumatic tire of claim 1 further comprising a fabric reinforced member integral one with each bead portion, each fabric reinforced member having first and second ends each member being wrapped about the first and second plies and the corresponding bead core, both the first and second ends radially extending above the bead core.

8. The radial ply pneumatic tire of claim 1 wherein each radially inner surface of the bead portion is inclined relative to the axis of rotation at an angle in the range of 5° to 10.5°.

9. The pneumatic tire of claim 4, wherein at least one cord reinforced member has metallic cords.

10. The pneumatic tire of claim 9, wherein the metallic cords are steel.

11. The pneumatic tire of claim 3 wherein the overlay has cords of aramid.

12. The pneumatic tire of claim 11 wherein the overlay is spirally wound about the reinforcing belts.

13. The pneumatic tire of claim 12, wherein the overlay is formed by abutted or overlapping strips of material, the strips having a width of approximately 2.5 cm.

14. The pneumatic tire of claim 1 wherein each bead core is formed by a monofilament of steel wire.

15. The pneumatic tire of claim 2 wherein the pair of first and the pair of second fillers are elastomeric.

16. The pneumatic tire of claim 15, wherein the first and second fillers are elastomeric having the following similar material properties: Shore A Hardness in the range of about 60 to about 70, 100% Modulus in the range of about 5 to about 7 MPa, and a Cold Rebound value (at about 23° C.) in the range of about 50 to about 70.

17. The pneumatic tire of claim 16 wherein the first ply and second ply of the carcass reinforcing structure have an elastomeric ply coat having material properties substantially similar to the first and second fillers.

18. The pneumatic tire of claim 16, wherein the first and second fillers have material properties $E'$ and $E''$, both at 100 degrees C., $E'$ being in the range of about 10 to about 15 MPa and $E''$ being in the range of about 0.5 to about 1.5 MPa.

19. The pneumatic tire of claim 17 wherein, based on 100 parts by weight rubber, (A) the fillers are comprised of about 60 to about 100 parts natural cis 1,4-polyisoprene rubber and, correspondingly, up to about 40 parts of at least one of cis 1,4-polybutadiene rubber and isoprene/butadiene rubber and (B) the plycoats are comprised of up to 100 parts natural cis 1,4-polyisoprene rubber and, correspondingly, up to about 100 parts of at least one of isoprene/butadiene copolymer rubber and cis 1,4-polybutadiene rubber; wherein the ratio of isoprene to butadiene in said isoprene/butadiene copolymer is in a range of about 30/70 to about 60/40.

20. The pneumatic tire of claim 19 wherein, based on 100 parts by weight rubber, the fillers are comprised of about 60 to about 90 parts natural rubber and, correspondingly, about 10 to about 40 parts of at least one of cis 1,4-polybutadiene and isoprene/butadiene copolymer rubber.

21. The pneumatic tire of claim 19 wherein, based on 100 parts by weight rubber, the plycoats are comprised of about 80 to about 100 parts natural rubber and, correspondingly, up to about 20 parts isoprene/butadiene copolymer rubber.

22. The pneumatic tire of claim 19 wherein, based on 100 parts by weight rubber, the plycoats are comprised of about 80 to about 95 parts natural rubber and, correspondingly, about 20 to about 5 parts of at least one of isoprene/butadiene copolymer rubber and cis 1,4-polybutadiene rubber.

23. The pneumatic tire of claim 19 wherein the filler is comprised of about 60 to about 90 parts natural rubber and correspondingly, about 10 to 40 parts cis 1,4-polybutadiene rubber and the plycoats are comprised of about 80 to about 95 parts natural rubber and about 20 to about 5 parts isoprene/butadiene copolymer rubber.

24. A radial ply pneumatic tire having an axis of rotation, a tread having a pair of lateral edges, a pair of reinforcing belts located radially inward of the tread, a pair of sidewalls, one sidewall extending radially inwardly from each lateral edge, a maximum section width, and a tire carcass structure, the tire carcass structure comprises:

a) a pair of bead portions, one bead portion extending radially inwardly from each sidewall, each portion including a substantially inextensible core wherein the bead core has a coil of annularly wound round metal wire filaments, which in the toroidially shaped tire prior to its vulcanization, has a polygonal cross-sectional area defined by imaginary line segments contacting the outer surfaces of the filaments of the coil, the polygonal cross-sectional area has a flat base surface having a pair of edges and a width "W" between the edges and an axially inner first surface, an axially outer second surface and a radially outward point or surface, each first and second surface extending radially outwardly from an opposite edge of the flat base surface toward the radially outward point or surface, each first and second surface being tangent to the bead core, the first surface and the flat base surface forming an acute included angle $\alpha$ and the second surface and the flat base surface forming an acute included angle $\beta$, where $\alpha$ is greater than or equal to $\beta$;

b) a carcass reinforcing structure radially inward of the reinforcing belts extending circumferentially about the tire from one bead portion to the other bead portion, the carcass reinforcing structure having a first ply and a second ply, each ply having a pair of turnup ends, one turnup end of each ply being wrapped about each bead core and extending axially and radially outwardly, the turnup end of at least one ply terminating radially in proximity to the radial location of the maximum section width of the tire;

c) an inner liner radially inward of the first ply;

d) a pair of first fillers, a pair of second fillers, the first fillers each being between the first ply and the innerliner, one first filler extending from each bead portion radially outward to beneath the reinforcing belt, the second fillers being between the first and second ply, one second filler extending from each bead portion radially outward to beneath the reinforcing belt; and e) a bead filler located above each bead core and between the second ply and the turnup ends of the first and second plies.

25. The radial ply pneumatic tire of claim 24, further comprises:

an aramid overlay being radially outward of the reinforcing belts.

26. The radial pneumatic tire of claim 24 further comprises:

at least one cord reinforced member located between each bead filler and each second ply turnup, each cord reinforced member or members having a first end and a second end, the first end being axially and radially inward of the second end and each cord reinforced member or members increasing in radial distance from the axis of rotation of the tire as a function of distance from its first end.

27. The radial ply pneumatic tire of claim 24, wherein each bead core has a radially outer surface extending between the first and second surfaces, the radially outer surface having a maximum height of H, H being less than the width of the base W.

28. The radial ply pneumatic tire of claim 24, wherein the first and second plies have cords of rayon.

29. The radial ply pneumatic tire of claim 24 further comprising a fabric reinforced member integral one with each bead portion, each fabric reinforced member having first and second ends each member being wrapped about the first and second plies and the corresponding bead core, both the first and second ends radially extending above the bead core.

30. The radial ply pneumatic tire of claim 24 wherein the radially inner surface of each bead portion is inclined relative to the axis of rotation at an angle in the range of 5° to 10.5°.

31. The pneumatic tire of claim 24, wherein the first and second fillers are elastomeric having the following similar material properties: Shore A Hardness in the range of about 60 to about 70, 100% Modulus in the range of about 5 to about 7 MPa, and a Cold Rebound value (at about 23° C.) in the range of about 55 to about 70.

32. The pneumatic tire of claim 26 wherein the first ply and second ply of the carcass reinforcing structure have an elastomeric ply coat having material properties substantially similar to the first and second fillers.

* * * * *